Fig. 1.

F. W. BEARDSLEY.
DISH CLEANSING APPARATUS.
APPLICATION FILED MAR. 6, 1914.

1,212,171.

Patented Jan. 16, 1917.
5 SHEETS—SHEET 4.

Witnesses:
W. H. Hawkins
A. R. Appleman

Inventor,
Frank W. Beardsley.
By his Attorney Albert C. Tanner

F. W. BEARDSLEY.
DISH CLEANSING APPARATUS.
APPLICATION FILED MAR. 6, 1914.

1,212,171.

Patented Jan. 16, 1917.
5 SHEETS—SHEET 5.

UNITED STATES PATENT OFFICE.

FRANK W. BEARDSLEY, OF BROOKLYN, NEW YORK, ASSIGNOR TO SEABOARD SPECIALTY CORPORATION, OF NEW YORK, N. Y., A CORPORATION OF NEW YORK.

DISH-CLEANSING APPARATUS.

1,212,171.    Specification of Letters Patent.    Patented Jan. 16, 1917.

Application filed March 6, 1914. Serial No. 822,992.

*To all whom it may concern:*

Be it known that I, FRANK W. BEARDSLEY, a citizen of the United States, and a resident of New York, Brooklyn borough, in the county of Kings and State of New York, have invented certain new and useful Improvements in Dish-Cleansing Apparatus, which improvements are fully set forth in the following specification.

This invention relates to improvements in contrivances of that class quite generally availed of for cleansing in succession soiled dishes, and the like, such contrivances being well-designated dish-cleansing apparatus.

The object of this invention is to provide a dish-cleansing apparatus which shall be simple and comparatively inexpensive as regards its construction; durable, efficient and mainly automatic in practical service; which shall embody novel features of construction whereby each dish to be cleansed shall, while sustained in an approximately upright position edgewise, be subjected to a plurality of successively-arranged, differential cleansing-baths, together with additional novel features of construction pertaining more particularly to the reception of each dish to be cleansed, its conveyance from one to another, in succession, of said cleansing-baths, and its automatic delivery when duly cleansed, all on the part of said apparatus when in practical service; and which shall possess certain well-defined advantages over prior analogous constructions.

The invention consists in the combinations, details and parts whereby, together with the novel disposition and relative arrangement of said parts, the attainment of the foregoing object is rendered practicable, all of which will be hereinafter more specifically referred to and set forth in the appended claims.

The invention is clearly illustrated in the accompanying drawings, wherein—

Having reference to the accompanying drawings, wherein similar reference-numerals denote like parts throughout the several views, I make use, in carrying out my invention and wherein it is contemplated that the various dishes to be cleansed shall be successively subjected, first to a heated cleansing bath under strong pressure, thereafter to a heated, comparatively still cleansing bath, and thereafter again to a heated cleansing bath under strong pressure, or a plurality thereof, of a tank 2, provided with a general outlet 2', from which leads a general draw-off conduit 2", controlled by a valve 2''', and with an overflow nozzle 3, the latter communicating, by preference, with the conduit 2", as by way of a suitable by-pass 3'.

Figure 3:
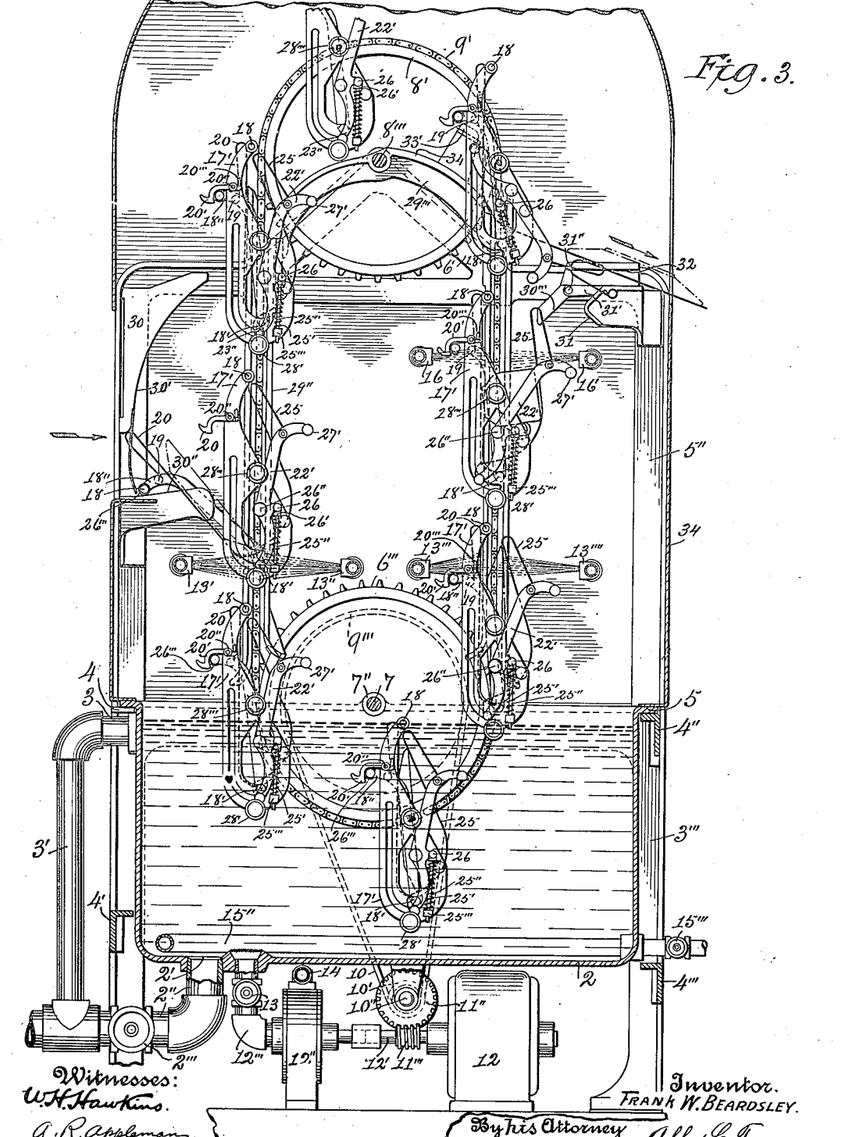
Fig. 3 is a vertical transverse section, as along the line $x-x$ of Fig. 2, the dish-containers attached to the endless conveyer appearing in side elevation.

Any medium or structure suitable to the purpose, may be availed of for supporting the tank 2, though in this connection I prefer to employ an upstanding, frame-work structure which comprises opposite frame-sections 3" 3''', suitably connected together, as through the medium of a pair of front cross-pieces 4, 4' and a pair of like rear cross-pieces 4", 4''', said tank having a suitable flange 5 extending more or less continuously along its upper edge and which overlies, accordingly, the cross-pieces 4, 4", respectively, and said opposite frame-sections, respectively, all as clearly indicated in Fig. 3, and whereby the tank aforenamed becomes removably suspended within said frame-work structure.

Frame-pieces 5', 5", rise from the frame-structure aforenamed, at its opposite sides, and afford, at the upper extremities thereof, the one a bearing 6 and the other a like bearing 6'.

Opposite carrying-wheels 6'', 6''', are firmly mounted on a shaft 7, journaled to rotate in opposite bearings 7', 7'', said bearings being arranged at the top of the tank 2, one midway the length of each side thereof; while additional, opposite carrying-wheels 8, 8', are firmly mounted, the former on a stub-shaft 8'', journaled to rotate in the bearing 6, and the latter on a similar stub-shaft 8''', journaled to rotate in the bearing 6'.

The carrying-wheel 8 occupies the same vertical plane as the carrying-wheel 6'', and the carrying-wheel 6''' occupies the same vertical plane as the carrying-wheel 8', the carrying-wheels 6'' 6''' normally projecting downwardly more or less into the tank 2, by preference.

There is disposed to operate on the respective carrying-wheels aforenamed an endless, flexible conveyer, consisting, in this instance, of opposite sprocket-chains 9, 9', held duly spaced apart, each relatively to the other and at suitable intervals therealong by means of a plurality of cross-ties 9'', each of said cross-ties being, by preference, in the form of a shaft journaled at one of its ends in a block constituting a constituent element of one of said sprocket-chains, and at its opposite end, in a similar block, serving as a constituent element of the opposite sprocket-chain.

Where opposite sprocket-chains, as 9, 9', are availed of for the purpose stated, each of the several carrying-wheels aforenamed should take the toothed form of a sprocket-wheel, so-called, as will be readily understood.

For duly driving the several carrying-wheels aforenamed, with the endless conveyer aforenamed disposed to operate thereon, any appropriate transmission mechanism may be interposed between the shaft 7 and any available source of power and motion; though in this connection I purpose firmly mounting on the shaft 7 a sprocket-wheel 9''', of a suitably enlarged diameter, and in connection, as through the medium of a driving sprocket-chain 10, with an intermediate sprocket-pinion 10', the latter firmly mounted on a counter-shaft 10'', journaled to rotate in suitable, opposite bearings, as 11, 11', and having firmly mounted thereon a worm-wheel 11'', in mesh with a suitable worm-pinion 11''', said worm-pinion being firmly mounted on the main shaft of a suitable motor, as 12, and said motor being of the electrically operated type, and situated under the tank 2, by preference.

The main shaft, as 12', of the motor 12, is extended to receive thereon and to be directly driven thereby, a rotary pump 12'', the same being fitted with an intake conduit 12''' leading, preferably, from the bottom of the tank 2, and by way of which the fluid contents of said tank may, in practice, be drawn into said pump, said intake conduit being controlled by a valve 13.

Through the medium of the pump 12'' the fluid contents of the tank 2 is conducted, by way of a suitable system of piping, to and into a system, comprising opposite pairs, of jet-terminals 13', 13'', 13''', 13'''', and delivered, simultaneously and at proper intervals, from such of said jet-terminals as are comprised in either pair thereof, and from each thereof in the direction of the other, in the form of a multiplicity of jets, each under strong pressure.

The jet-terminals aforenamed are collectively positioned above, and suitably overlie the tank 2, whereby the cleansing fluid delivered therefrom, or any thereof, ultimately falls and is returned to and into said tank, and a due circulation of said cleansing fluid, between the latter and said jet-terminals, respectively, is accordingly effected and maintained.

Figure 4:
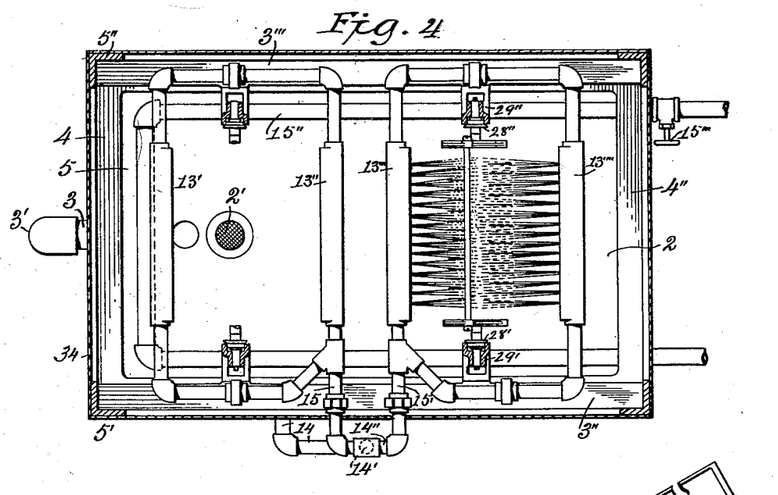
Fig. 4 is a horizontal section, as along the line $y-y$ of Fig. 1, the conveyer, including the parts immediately coöperating therewith, being removed.
Figure 5:
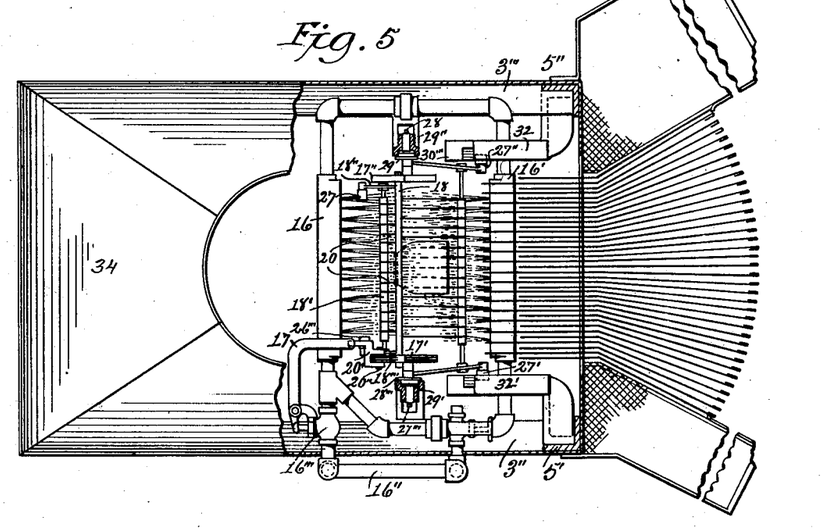
Fig. 5 is a plan view of the construction, the crown of the casing being partially broken away, and the conveyer, including the parts immediately coöperating therewith, being removed.

The opposite jet-terminals comprised in each pair thereof aforenamed are, by preference, circuitously interconnected each with the other, as through the medium of suitable piping interconnecting the same at the opposite ends thereof, and whereby, in each instance, an endless, cleansing-fluid terminal-conductor, embodying as constituent elements thereof, said pair of opposite jet-terminals, is formed, all as clearly indicated in Fig. 4.

While any suitable piping system may be provided intermediate of the respective jet-terminals aforenamed, or of the respective terminal-conductors aforenamed, and the pump 12'', I purpose employing, said pump being situated under the tank 2, an initial horizontal section 14, an upwardly extending section 14', an intermediate section 14'', and opposite final sections 15, 15', these several pipe sections being arranged for intercommunication, and said final sections each communicating, in this instance, with one of the endless terminal-conductors aforenamed, and by preference, more or less tangentially with respect thereto.

The arrangement of the endless conveyer aforenamed relatively to the terminal-conductors above mentioned, is such that, in practice, the descending run of said conveyer moves downwardly through the endless figure described by one of said terminal-conductors, while the ascending run of said conveyer moves upwardly through the endless figure described by the other of said terminal-conductors, the lower portion of the conveyer dipping, by preference, more or less into the tank 2, and, ordinarily, measurably into the fluid contents of said tank.

In this instance, the jet-terminals constituting constituent elements of each of the terminal-conductors aforenamed are positioned, respectively, in advance of, and rearwardly of, the adjacent run of the conveyer, said run moving downwardly or upwardly, as the case may be, between them, and each thereof being further arranged in parallelism with the other and with the longitudinal axis of the general course of movement of said conveyer, which course of movement intersects and extends through, accordingly, the field of cleansing fluid forcibly delivered, in the form of a multiplicity of jets, by each of said jet-terminals, in the direction of the other.

Above the terminal-conductor through the endless figure described by which moves the ascending run of the conveyer aforenamed, I purpose employing an additional terminal-conductor, which conforms in all essential details of construction and general arrangement to either of the terminal-conductors hereinbefore alluded to, the same embodying, as constituent elements thereof, opposite jet-terminals 16, 16' and being in communication, as through the medium of a system of piping 16'', with any appropriate source of fluid suitable for rinsing purposes, such fluid, when delivered thereto, being under strong pressure, and, by preference, of a markedly high temperature.

The piping system leading to and communicating with the jet-terminals 16, 16', respectively, is controlled by a valve 16''', yieldingly held closed under normal conditions and adapted to be intermittently opened, as through the medium of a trip-lever 17, and in a manner and for a purpose to be hereinafter more fully explained.

Figure 6:
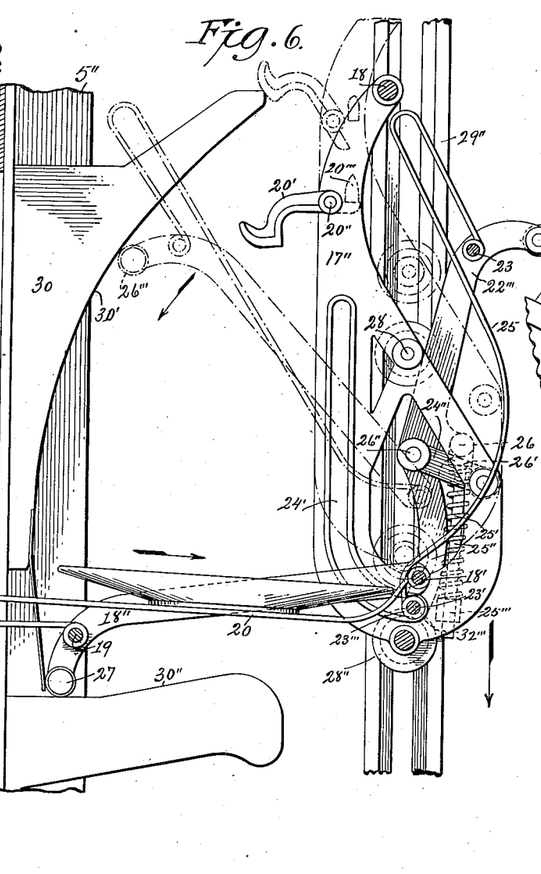
Fig. 6 is a detail view, enlarged to show more clearly the elements availed of for automatically opening the dish-container, and for automatically, duly thereafter, closing the same, all with proper relation to the receiving station of the apparatus.
Figure 7:
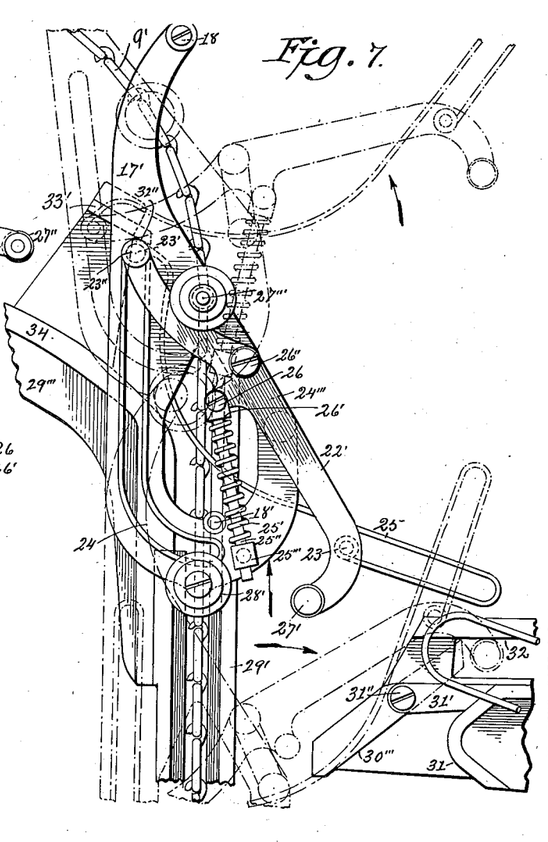
Fig. 7 is a view similar to Fig. 6, showing more particularly the elements availed of for effecting, automatically, the delivery from the dish-container of the cleansed dish contained therein, all with proper relation to the delivery station of the apparatus.

The conveyer aforenamed is provided with a medium suitable for holding relatively thereto a dish, or other article or articles to be cleansed, such medium taking, in this instance and by preference, the general form of a double-acting, open-work basket, pendently attached to said conveyer, and conforming, measurably, in details of construction to the basket or container forming the subject-matter of my co-pending application, filed October 4, 1912, and serially numbered 723,877. Hence, my present basket for containing a dish or the like to be cleansed comprises opposite side-members 17', 17'', connected at their opposite ends by suitable tie-rods 18, 18', thereby forming for the basket a general frame or bail. Said bail supports obverse and reverse, open-work retaining-racks, the former, for receiving purposes, adapted to be rocked out of its clamping or closed position to an approximately horizontal position with respect to the bail which supports it, and the latter, for delivery purposes, adapted to be rocked out of its clamping or closed position to a position more or less inverted, with respect to the bail which supports it, all as clearly indicated in Figs. 6 and 7 of the drawings, and as will hereinafter more fully appear.

The obverse retaining-rack comprises opposite side-members 18'', 18''', firmly connected by suitable tie-rods 19, the tie-rod being extended at its opposite ends through and rockably bearing in the opposite members 17', 17''. Said obverse retaining-rack affords, intermediate of its side-members, an open-work wall formed, preferably, by interposing between the tie-rods 19, a series of suitably spaced wire-strands 20, each turned around, or otherwise engaging, at its opposite ends, said tie-rods and connecting each thereof with the other, accordingly. Said obverse retaining-rack swings downwardly and upwardly, as on the axis of the tie-rod 19, and is temporarily locked, when swung into its closed position—the limit of its upward swinging movement—against a return or downward swinging movement, in any appropriate manner, though preferably through the medium of a gravity-catch 20', the latter supported, as by the member 17'', near the top thereof, and working on a pivot, as 20''. Catch 20' coöperates with a stud 20''' and is provided with a tail-piece, which normally engages a stop 21''', whereby said catch is restrained against an undue downward swinging movement, and is held at all times properly positioned for lockingly coöperating with the stud, or roller thereon, aforenamed.

The foregoing locking parts are preferably duplicated at the opposite side of the obverse retaining-rack.

The reverse retaining-rack, supported by the bail aforenamed, comprises opposite side-members 22', 22''', firmly connected by suitable tie-rods 23, 23', the tie-rod 23' being extended at its opposite ends through and suitably beyond the members 22', 22''', to receive opposite rollers 23'', 23''', which rollers operate, the one in a slot-like opening 24, formed in the member 17', and the other in a corresponding opening 24', formed in the member 17''. The reverse retaining rack is attached at its opposite sides to the frame or bail aforenamed, as through the medium of opposite links 24'', 24''', has, accordingly, a compound rocking movement relatively thereto, and affords, intermediate of its side-members, an open-work wall formed, preferably, by interposing between the tie-rods 23, 23', a series of suitably spaced, wire-strands 25, each turned around, or otherwise engaging, at its opposite ends, said tie-rods, and connecting each thereof with the other, accordingly. The reverse retaining-rack is elastically controlled in its rocking movements, and preferably through the medium of a spiral spring 25', which, under the rocking action of said retaining-rack, shifts in such a manner that its elastic force tends to keep said retaining-rack closed, when closed, and open, when opened. Accordingly, I purpose making use of a stem 25'', encircled by the spring 25', said stem slidingly engaging at its lower end-portion a rocking head 25''', and being pivotally attached at its upper end to, say, the member 22', midway the length thereof, and as at the point 26, said head being supported, say, by the member 17', and said spring bearing at its lower end against said head, at its upper end against a shoulder 26', with which stem 25'' is provided, and tending at all times to expand lengthwise, whereby its elastic force is transmitted to said retaining-rack, through the medium of the shoulder aforenamed, as will be readily understood.

The point of pivotal connection of the stem 25'', with, say, the member 22', is such as to undergo an arc of movement mainly beneath and concentric to, the point, as 26'', of compound rocking movement of said retaining-rack relatively to the bail which supports it, the spring aforenamed being shifted into and out of opposite positions with respect to the point 26'', accordingly, and as said rack undergoes its opening and closing movements, and the stem 25'' giving and taking with respect to the head 25''' to permit this operation of the parts now under consideration.

The parts aforenamed for elastically controlling the reverse retaining-rack are preferably duplicated at the opposite side thereof, where an additional spring stem and rocking-head are disposed and correspond, respectively, to the spring 25', stem 25'' and head 25'''.

As regards the wire-strands used in the construction of the retaining-racks, respectively, aforenamed, I purpose that the same shall collectively overlie, extend beyond and return to engagement, in the one instance with the tie-rod 19, and in the other instance with the tie-rod 23, all as clearly shown in the drawings.

The obverse and reverse retaining-racks are provided, the one with opposite rollers 26''', 27, at the upper ends of its side-members, respectively, and the other with like opposite rollers 27', 27'', at the upper ends of its side-members, respectively. The purpose of these several rollers will be explained hereinafter.

Figure 1:
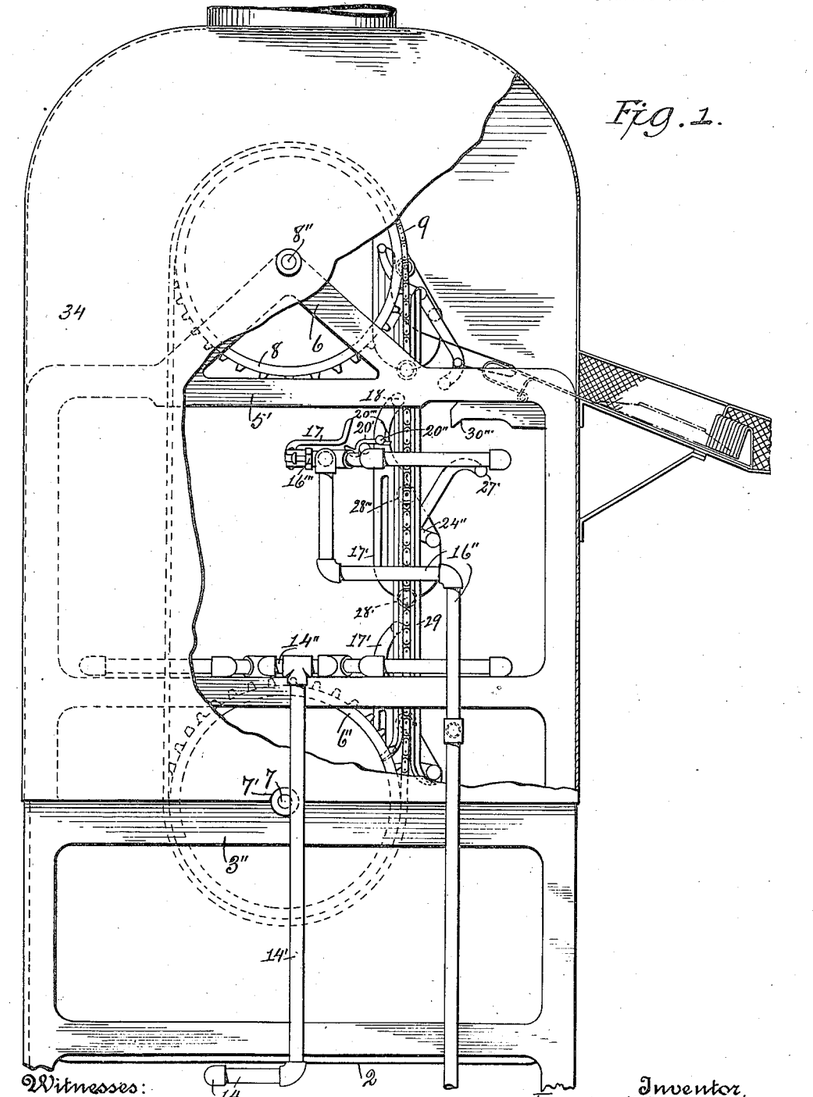
Figure 1 is a side elevation of a dish-cleansing apparatus embodying my said improvements, a portion of the casing being broken away.
Figure 2:
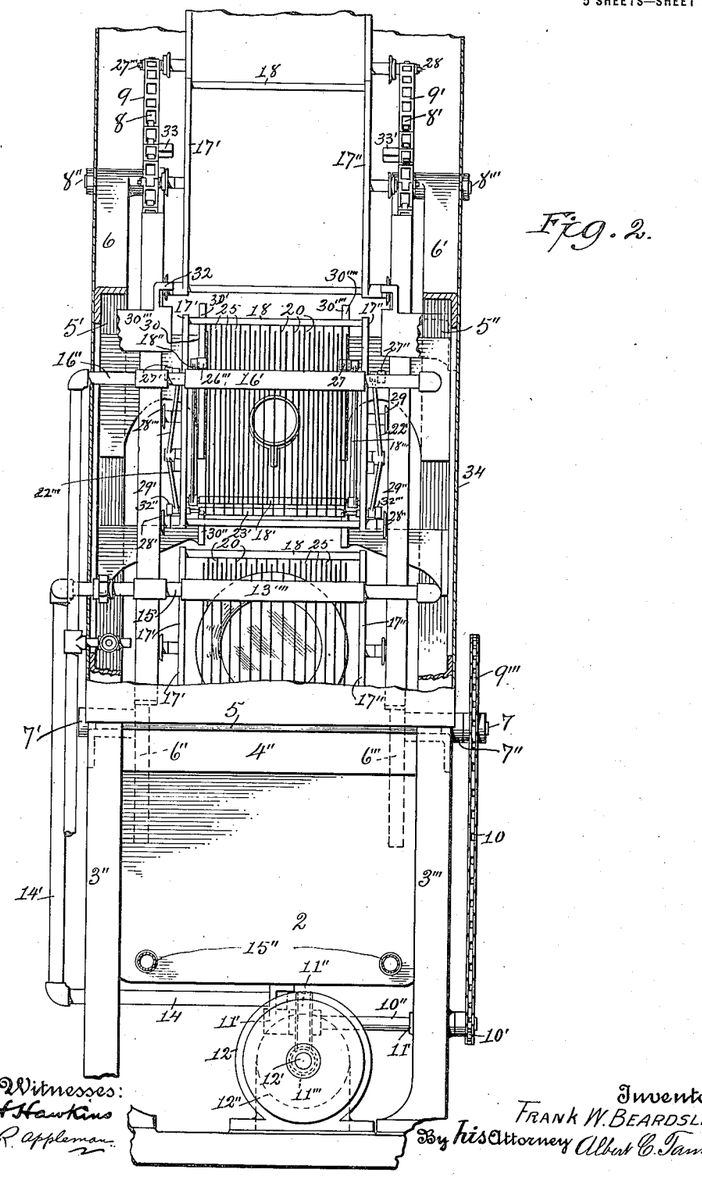
Fig. 2 is a front elevation of same, the obverse portion of the casing being mainly broken away.

The basket made use of in my improved dish-cleansing apparatus is disposed between, and pivotally attached, above its center of gravity, to, the opposite chains 9, 9', constituting the endless flexible conveyer aforenamed, and as at the points 27''', 28, Fig. 2, said basket being provided at its opposite sides, and at a low point therealong, with opposite, guide-engaging rollers 28', 28'', and thereabove, by preference, with additional opposite, guide-engaging rollers 28''', 29.

I further provide opposite guides 29', 29'' with which coöperate, respectively, the guide-rollers at the opposite sides of the basket aforenamed, said guides being each arranged in approximate conformity to the course of movement of the conveyer aforenamed, and extending suitably therealong, particularly at, and in due relation to, the receiving and delivery stations of the apparatus.

As here shown, each of the guides aforenamed comprises opposite upright sections, connected at their upper ends by an upwardly bowed section, as 29''', the upright sections of one of said guides having, each, a vertical channel or space, substantially as shown, for the accommodation of the opposite runs of, say, the chain 9, and within which channel or space operates, or operate, the guide-roller, or guide-rollers at the adjacent side of the basket aforenamed, while the upright sections of the opposite guide have, each, a corresponding channel or space, for the accommodation of the opposite runs of, say, chain 9', and within which channel or space operates, or operate, the guide-roller, or guide-rollers, at the opposite side of said basket.

As the conveyer aforenamed continues to move, the obverse retaining-rack of the basket will automatically duly open to the end that a dish to be cleansed may be placed thereon, at the receiving station of the apparatus; whereupon said rack will automatically close for retention of the dish in the basket, the latter, with the dish contained therein, and as said conveyer continues to move, being first passed downwardly through the field of cleansing fluid issuing from the jet-terminals 13', 13'', whereby particles of food and the like adhering to the contained dish will be primarily and well loosened; from said jet-terminals said basket, with its contained dish is conveyed downwardly into, along, and upwardly out of the comparatively still bath of cleansing fluid contained in tank 2, the contained dish being thereby subjected to a further cleansing operation; from the tank 2 said basket with its contained dish is passed upwardly through the field of cleansing fluid issuing from the jet-terminals 13''', 13'''', and thereby subjecting the contained dish to a still further cleansing operation; and from the jet-terminals 13''', 13'''' said basket with its contained dish is conveyed through a field of rinsing fluid caused, at the proper time, to issue from the jet-terminals 16, 16'. Then, on said basket approaching and arriving at the delivery station of the apparatus, the reverse retaining-rack of said basket is caused to automatically open for the delivery of the cleansed dish contained therein.

For controlling the open movement of the obverse retaining-rack aforenamed, I provide an ease-away member 30, upstanding and having a top extension whose free end is adapted to be engaged, as the conveyer moves, by the nose of the catch 20″, said catch being accordingly duly actuated to release said obverse retaining-rack whereby the latter is permitted to swing downwardly, as by its own gravity, with the roller at the top of its adjacent side-member engaging the cam, or irregular edge, as 30′, of said ease-away member, said rack being thereby eased into a position approximately horizontal to the conveyer, for the reception of a dish to be cleansed. Whereupon, the roller aforenamed engages and rolls along a suitable cam-face 30″, which, as the conveyer continues to move, causes said rack to automatically close, the catch 20″ being accordingly lifted and thereafter allowed to fall into locking engagement with said rack, at the top thereof, the dish aforenamed being now securely locked within the basket.

For like coöperation with the roller supported by the opposite side-member of said obverse retaining-rack, I provide an additional ease-away member, corresponding to 30, and an additional cam-face, corresponding to 30′.

For effecting automatically the opening movement of the reverse retaining-rack aforenamed, I provide a duly supported tripping device, which affords a fixed, direct cam-face 30‴, arranged opposite to an irregular cam-face 31, the passage between the cam-faces 30‴, 31, being of substantial width at its entrance, and normally spanned at its upper terminus by a gravity bridge-piece 31′, working on a pivot 31″, said bridge-piece affording along its underside a direct cam-face adapted, when said bridge-piece is elevated, to stand in registry with the cam-face 30‴, and serving as an extension thereof leading to an overlying, reverse cam-face 32, duly supported, as by an upright member 32′. Now, as the basket containing a cleansed dish approaches the delivery station of the apparatus, the roller aforenamed supported by and at the top portion of the adjacent side-member of said reverse retaining-rack, enters the passage between the cam-faces 30‴, 31, casually engaging either thereof, and in passing upwardly out of said passage, lifts the bridge-piece 31′, say, to the position indicated in dotted lines in Fig. 7, and moves onward into engagement with the reverse cam-face 32, beyond the free end of said bridge-piece, thus liberating the latter and permitting the same to fall, as to the position indicated in full lines in Fig. 7. Now, as the conveyer continues to move, said roller undergoes a return movement along the reverse cam-face 32, and ultimately escapes therefrom, being measurably aided in this return movement by the spring or springs aforenamed, provided for elastically controlling the opening and closing movements of said reverse retaining-rack.

In the above manner the tripping device aforenamed effects the opening of the reverse retaining-rack to a position more or less inverted, relatively to its closed position, thereby permitting the cleansed dish, contained in the basket aforenamed, to escape therefrom, as by a sliding movement downwardly along the reverse retaining-rack, when inverted as stated, this whole operation of effecting the delivery of a cleansed dish being accomplished automatically, as the conveyer of the apparatus continues to move.

For like coöperation with the roller aforenamed supported by the opposite side-member of the reverse retaining-rack, I prefer that an additional tripping device, as 32′, be provided, the same conforming in all essential details, to the tripping device above specifically described, though being reversed in its general disposition. As the basket continues to move upwardly beyond the delivery station of the apparatus, the extended opposite ends of the tie-rod 23′, or rollers, as 32″, 32‴, thereon, respectively, engage opposite, overhanging rails 33, 33′, afforded, one by each of the upwardly bowed sections, as 29‴, and whereby the reverse retaining-rack is caused to undergo, automatically, a return or closing movement, being ultimately aided in this movement by the spring or springs aforenamed.

The rollers 23″, 23‴, travel upwardly and downwardly within and along the slot-like openings 24, 24′, under the opening and closing movements, respectively, of the reverse retaining-rack aforenamed.

Again, as the basket continues to move upwardly from the delivery station of the apparatus, each of the guide-rollers 28′, 28″, at the lower, opposite sides of said basket, passes upwardly out of the vertical channel or space of the adjacent, upright guide-section, onto a rail 34, said rail being bowed generally upward, and shaped to ease the basket, without undue pendulous movement, from the upwardly moving run, to the downwardly moving run, of the conveyer, and bridging said upright guide-sections, at the tops thereof; and said rollers, particularly when aided by the additional rollers 28‴, 29, serving, when occupying the vertical channel or space afforded by any of the opposite, upright guide-sections, to restrain said basket against pendulous movement relatively to the conveyer which supports it, which result is desirable, particularly at and along those sections of the course of movement of the conveyer where the basket is automatically opened to receive a dish, and later automatically opened for the delivery of such dish.

As the basket passes upwardly between the jet-terminals 16, 16', from which issues the fluid intended for rinsing purposes, a part, as the catch 20", relatively fixed to said basket, engages, trips, and releases the lever 17, whereby the rinsing fluid, for rinsing the dish contained in the basket, is automatically supplied, at and during the proper period of time.

It will be understood that any appropriate number of baskets, each constructed and operating substantially as herein described, may be strung, suitably spaced apart, on the conveyer aforenamed.

The operation of my improved dish-cleansing apparatus will be apparent from the foregoing description thereof, it being necessary only to mention that the attendant, as the obverse retaining-rack of the basket, or of each of the baskets, made use of, opens at the receiving station, places thereon a dish to be cleansed, such rack then automatically closing, and serving not only to retain the dish within the basket, but to carry it and, when of the shallower type, duly place it in a vertical position edgewise therein, so that the fluid issuing from the jet-terminals comprised in any pair thereof made use of, will strongly impinge against the opposite faces of such dish.

The delivery of the dish when cleansed is effected automatically, as hereinbefore explained; and when so delivered, may be cared for in any appropriate manner.

The machine, throughout, is automatic in its operation, save the operation of feeding the basket or baskets thereof, as the same arrive at and pass from the receiving station.

I purpose that the supporting and operating parts situated above the tank 2, be inclosed by a general casing, as 34', open at its top and having suitable receiving and delivery openings.

It will be seen that my improved dish-cleansing apparatus is well adapted for the purposes for which it is intended, and further that the same may be modified, as to the various parts and details thereof, without departing from the scope of the claims hereto appended.

I claim:

1. A dish-cleansing apparatus comprising a tank; an endless conveyer, and an open-work basket, said basket pivotally attached, above its center of gravity, to said conveyer and at all times depending vertically from the point of the pivot, and conveyable thereby into and out of said tank.

2. A dish-cleansing apparatus comprising a tank; an endless conveyer; an open-work basket pivotally attached, above its center of gravity, to said conveyer and at all times depending vertically from the point of the pivot; and means for affording, above the tank aforenamed, a field of cleansing fluid under pressure, said conveyer adapted to convey said basket, first through said field of cleansing fluid, and thereafter into and out of said tank.

3. A dish-cleansing apparatus comprising a tank; an endless conveyer; an open-work basket pivotally attached, above its center of gravity, to said conveyer and at all times depending vertically from the point of the pivot; and means for affording, above the tank aforenamed, a field of cleansing fluid under pressure, said conveyer adapted to convey said basket, first into and out of said tank, and thereafter through said field of cleansing fluid.

4. A dish-cleansing apparatus comprising a tank; an endless conveyer; an open-work basket pivotally attached, above its center of gravity, to said conveyer and at all times depending vertically from the point of the pivot; and means for affording, above the tank aforenamed, opposite fields of cleansing fluid, each under pressure, said conveyer adapted to convey said basket, first through one of said fields of cleansing fluid, thereafter into and out of said tank, and thereafter through the other of said fields of cleansing fluid.

5. A dish-cleansing apparatus comprising a tank; jet-terminals arranged oppositely thereabove; an endless dish conveyer, whose orbit passes between said oppositely arranged jet terminals, and means for conveying a cleansing fluid from the interior of said tank, under pressure, to, and for delivery at, each of said jet-terminals, the latter being adapted, each to deliver said cleansing fluid in the direction of the other.

6. A dish-cleansing apparatus comprising a tank; an endless conveyer; and an open-work basket, said basket pivotally attached, above its center of gravity, to said conveyer and at all times depending vertically from the point of the pivot, conveyable thereby into and out of said tank, and affording a rack, the latter adapted, at a suitable point in the course of movement of the conveyer aforenamed, to receive and thereafter convey into, and retain within, said basket, a dish to be cleansed.

7. A dish-cleansing apparatus comprising a tank; an endless conveyer; and an open-work basket, said basket pivotally attached, above its center of gravity, to said conveyer and at all times depending vertically from the point of the pivot, conveyable thereby into and out of said tank, and affording a rack, the latter adapted, at a suitable point along the course of movement of said conveyer, to rock more or less invertibly on the basket aforenamed, for the delivery of a dish contained therein.

8. A dish-cleansing apparatus comprising an endless conveyer; an open-work basket pivotally attached, above its center of gravity, to said conveyer and at all times depending vertically from the point of the pivot, and affording an obverse retaining-rack, said retaining-rack adapted, at a suitable point along the course of movement of the conveyer aforenamed, to undergo opening and closing movements relatively to said basket; means for easing said retaining-rack in its opening movement; means for effecting a return or closing movement thereof, and a device for locking the same in its closed position.

9. A dish-cleansing apparatus comprising an endless conveyer; an open-work basket pivotally attached, above its center of gravity, to said conveyer, and affording an obverse retaining-rack, said retaining-rack adapted, at a suitable point along the course of movement of the conveyer aforenamed, to undergo opening and closing movements relatively to said basket; a gravity catch for locking said retaining-rack in its closed position; an ease-away member adapted to trip said catch for the liberation of said retaining-rack, and ease the latter out of its closed position; and a cam-face, the latter situated at the lower terminus of the ease-away member aforenamed, and serving to effect a return or closing movement on the part of said retaining-rack.

10. A dish-cleansing apparatus comprising an endless conveyer; an open-work basket pivotally attached, above its center of gravity, to said conveyer, and affording a reverse retaining-rack, rockable thereon; and a tripping device, the latter situated at a suitable point along the course of movement of the conveyer aforenamed, and adapted to rock said retaining-rack more or less invertibly on the basket aforenamed, for the delivery of a dish contained therein.

11. A dish-cleansing apparatus comprising an endless conveyer; an open-work basket pivotally attached, above its center of gravity, to said conveyer, and affording a reverse retaining-rack, rockable thereon; and a tripping device, the latter situated at a suitable point along the course of movement of the conveyer aforenamed, affording direct and reverse cam-faces, and adapted to rock said retaining-rack more or less invertibly on the basket aforenamed, for the delivery of a dish contained therein.

12. A dish-cleansing apparatus comprising an endless conveyer; an open-work basket pivotally attached, above its center of gravity, to said conveyer, and affording a reverse retaining-rack, rockable thereon; and a tripping device, said tripping device situated at a suitable point along the course of movement of the conveyer aforenamed, affording a direct cam-face, a reverse cam-face thereabove, and a movable bridge-piece, the latter, when duly actuated, serving to prolong the direct cam-face aforenamed in the direction of said reverse cam-face, and being adapted to rock said retaining-rack on the basket aforenamed, for the delivery of a dish contained therein.

13. A dish-cleansing apparatus comprising an endless conveyer; an open-work basket pivotally attached, above its center of gravity, to said conveyer, and affording a reverse retaining-rack, rockable thereon; a device, at a suitable point along the course of movement of said conveyer, for causing said retaining-rack to rock more or less invertibly on the basket aforenamed, for the delivery of a dish contained therein; and means in advance of said device, considered with respect to the movement of the conveyer, for causing said retaining-rack to undergo a reverse or closing movement.

14. A dish-cleansing apparatus comprising an endless conveyer; an open-work basket pivotally attached, above its center of gravity, to said conveyer, and affording a reverse retaining-rack, rockable thereon; a device, at a suitable point along the course of movement of said conveyer, for causing said retaining-rack to rock more or less invertibly on the basket aforenamed, for the delivery of a dish contained therein; and a rail, the latter measurably overhanging said retaining-rack and serving to cause the same to undergo a reverse or closing movement.

15. A dish-cleansing apparatus comprising an endless conveyer; an open-work basket pivotally attached, above its center of gravity, to said conveyer, and affording a retaining-rack rockable thereon; means for causing said retaining-rack to automatically open and close, at a suitable point along the course of movement of the conveyer aforenamed; and means for preventing oscillation of said basket, relatively to said conveyer, and during the opening and closing actions of said retaining-rack.

16. A dish-cleansing apparatus comprising an endless conveyer; an open-work basket pivotally attached, above its center of gravity, to said conveyer, and affording a guide-roller; and a guide, the latter comprising opposite sections, each provided with a suitable channel, said guide-roller operating in the channels, respectively, of said guide-sections, and thereby preventing oscillation of said basket with respect to the conveyer aforenamed, and said basket being adapted to receive a dish to be cleansed, at one point, and deliver said dish, at another point along the course of movement of said conveyer.

17. A dish-cleansing apparatus comprising an endless conveyer; an open-work basket pivotally attached, above its center of gravity, to said conveyer; and an upright guide, the latter communicating at its top with a drag-rail, and the basket aforenamed affording a part adapted to coöperate successively with said guide and drag-rail, and whereby oscillation of said basket relatively to said conveyer is prevented.

18. A dish-cleansing apparatus comprising an endless conveyer; a jet-terminal, situated adjacent to the course of movement of said conveyer, and capable of delivering a supply of fluid; a valve controlling said jet-terminal; and a device carried by said conveyer for automatically and temporarily opening said valve.

19. A dish-cleansing apparatus comprising an endless conveyer; an endless terminal-conductor, capable of delivering a supply of fluid, the course of movement of said conveyer intersecting and extending through the endless figure described by said terminal-conductor; and a valve for controlling the latter, said conveyer affording a device for automatically and temporarily opening said valve.

FRANK W. BEARDSLEY.

Witnesses:
W. B. HERBERT,
A. G. N. VERMILYA.